Figure 1:
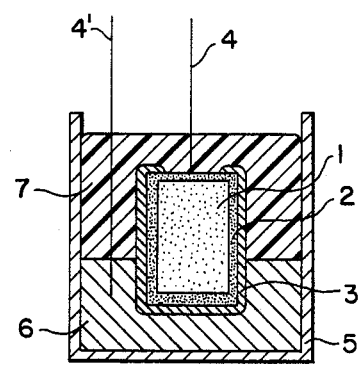

United States Patent [19]

Niwa

[11] Patent Number: 4,580,855

[45] Date of Patent: Apr. 8, 1986

[54] SOLID ELECTROLYTE CAPACITOR

[75] Inventor: Shiichi Niwa, Moriguchi, Japan

[73] Assignee: Sanyo Electric Co., Ltd., Osaka, Japan

[21] Appl. No.: 368,001

[22] Filed: Apr. 13, 1982

[30] Foreign Application Priority Data

Apr. 17, 1981 [JP] Japan .................................. 56-58816
Jul. 24, 1981 [JP] Japan ................................ 56-116861

[51] Int. Cl.⁴ .............................................. H01G 9/05
[52] U.S. Cl. .................................. 361/433 E; 252/62.2
[58] Field of Search ......................... 252/62.2; 361/433

[56] References Cited

U.S. PATENT DOCUMENTS 3,872,358  3/1975  Murakami et al. ................. 252/62.2

OTHER PUBLICATIONS

J. Am Chem. Soc., 84, 3374-3387 (1962).

Primary Examiner—John Kight
Assistant Examiner—M. L. Moore
Attorney, Agent, or Firm—Wegner & Bretschneider

[57] ABSTRACT

In a solid electrolyte capacitor with a solid electrolyte, an improvement wherein the solid electrolyte is the one obtained by cooling a 7,7,8,8-tetracyanoquinodimethane salt in a liquid state for solidification, the 7,7,8,8-tetracyanoquinodimethane salt being so stable in a liquid state as not substantially decomposing for a sufficient period of time from completion of its liquefaction.

23 Claims, 1 Drawing Figure

SOLID ELECTROLYTE CAPACITOR

The present invention relates to a solid electrolyte capacitor and a solid electrolyte therefor.

In general, a solid electrolyte capacitor comprises a film forming metal (e.g. aluminum, tantalum, niobium) having an anodized surface and a solid electrolyte attached thereto. The solid electrolyte in the capacitor of this kind is usually made of manganese dioxide. However, manganese dioxide has such drawbacks as causing damage to the anodized surface of the metal on the thermal decomposition for its formation and having inferior repairability for the anodized surface. In order to overcome these drawbacks, the use of organic semiconductors, particularly 7,7,8,8-tetracyanoquinodimethane (hereinafter referred to as "TCNQ") salts, instead of manganese dioxide has been proposed. TCNQ salts show themselves high electroconductivity and good repairability. Since, however, they are normally formed in powdery crystals, their attachment to film forming metals is not easy. While film forming metals used in the manufacture of solid electrolyte capacitors are porous in most cases, the uniform impregnation of such porous metals with TCNQ salts is extremely difficult. In addition, TCNQ salts have a possibility of decomposition and deterioration during the operations for impregnating and drying.

Conventional procedures for adhesion of TCNQ salts onto film forming metals can be classified into the following three: (1) the procedure wherein a solution of a TCNQ salt in an appropriate solvent (e.g. dimethylformaide) is applied onto a film forming metal, followed by drying to evaporate the solvent; (2) the procedure wherein a dispersion of finely divided crystals of a TCNQ salt in an appropriate solvent (e.g. ethanol) is applied onto a film forming metal, followed by drying to evaporate the solvent; and (3) the procedure wherein a TCNQ salt is vacuum evaporated onto a film forming metal.

Among them, the procedure (1) is disadvantageous in not achieving a high impregnation rate, because the solubility of a TCNQ salt is usually small. Even when, for instance, dimethylformamaide having a high solubility to a TCNQ salt is used as the solvent and a high temperature (e.g. 100° C.) is adopted for preparation of the solution, the solubility is at the most 10%. Because of this reason, repetitive application of the solution is necessary for formation of a layer of the TCNQ salt having a sufficient thickness on a film forming metal or impregnation of the metal with a sufficient amount of the TCNQ salt. When, for instance, a porous metal for a solid electrolyte capacitor rated to 1 $\mu$F is used, the repetitive application of the solution 5 to 10 times can attain an impregnation rate of only 30% or less impregnation with manganese dioxide being taken as 100%. Thus, the metal is porous, yet a solid electrolyte capacitor having a large capacity is not obtainable. Further, the metal applied with the solution is allowed to stand at a high temperature repeatedly for drying, during which, however, the TCNQ salt is more or less decomposed to cause the deterioration of the elctroconductivity. Moreover, the TCNQ salt thus attached onto the metal comprises fine crystals, and therefore a binding resin such as polyvinylpyrrolidone is frequently incorporated incorporated into the solution so as to enhance the adhesive strength of such crystals. Since the binding resin is an electrically insulating material, it causes also the deterioration of the electroconductivity.

In case of the procedure (2), the micronization of powdery crystals of a TCNQ salt has a certain limitation. Further, the adhesive strength of the crystals onto a film forming metal is small. Thus, elimination of the solid electrolyte made of the TCNQ salt from the metal occurs frequently. Also, the deterioration of various characteristics such as increase of the loss and decrease of the capacity is often observed. While the adhesive strength can be improved to a certain extent by incorporation of a binding resin, such binding resin causes the depression of the electroconductivity. Since a dispersion of the crystals of the TCNQ salt is used, the impregnation rate into a porous metal is particularly inferior. Even if an ultrasonic diffusion impregnation method is applied, the impregnation rate is not much improved. In case of the procedure (3), vacuum evaporation is troublesome in operation and further not suitable for attachment of a TCNQ salt onto a porous metal.

As a result of the extensive study, it has now been found that the attachment of a TCNQ salt onto a film forming metal having an anodized surface by contacting the metal with the TCNQ salt in a liquid state and then solidifying the TCNQ salt provides a solid electrolyte capacitor having excellent performances.

A TCNQ salt in a liquid state is obtainable by simply heating the TCNQ salt in a powder state to melt it. However, the sole heating usually results in decomposition of the TCNQ salt to make it electrically insulated. Thus, the resultant product loses any useful function as the solid electrolyte for a solid electrolyte capacitor. Some certain kinds of TCNQ salts have, however, a certain period of time until they are decomposed after their melting. Such period is relatively short but sufficient to complete the operation for attachment of them onto film forming metals. In other words, a solid electrolyte having a high electroconductivity can be obtained from such TCNQ salts, provided that the heating for liquefaction and the cooling for solidification are accomplished prior to the decomposition. Because of this reason, TCNQ salts having a sufficient period of time until the decomposition after their melting for accomplishment of the necessary operations must be chosen specifically from various TCNQ salts. Besides, it may be noted that prior to this invention, it was entirely unknown whether the TCNQ salt once melted and then solidified had any comparable performances to the one before melting. Thus, the provision of excellent performances by the TCNQ salt once melted and then solidified could not be predicted previously.

TCNQ and its various salts as well as methods of their preparation are disclosed, for instance, in J. Am. Chem. Soc., 84, 3374–3387 (1962). TCNQ salts can be either simple salts of TCNQ represented by the formula: $M^{n+}(TCNQ)_n^-$ wherein M is an organic cation and n is the valence of the cation, or complex salts represented by the formula: $M^{n+}(TCNQ^-)_n(TCNQ)_m$ wherein m is a positive number and corresponds to a mole number of neutral TCNQ contained in one mole of the complex salt, and M and n are each as defined above. In this invention, however, the use of the complex salts is much preferred due to their better electric characteristics. Further, the complex salts of the said formula wherein m is around 1 are usually employed, although it may be somewhat smaller (e.g. 0.5) or larger (e.g. 1.5).

Examples of the TCNQ salts include TCNQ salts of N-substituted quinolines and isoquinolines, of which the substituent at the N-position is any hydrocarbon group such as $C_2$-$C_{18}$ alkyl (e.g. ethyl, propyl, butyl, pentyl, octyl, decyl, octadecyl), $C_5$-$C_8$ cycloalkyl (e.g. cyclopentyl, cyclohexyl), $C_3$-$C_{18}$ alkenyl (e.g. allyl), phenyl or phenyl($C_1$-$C_8$)alkyl (e.g. phenethyl). Preferred examples of the TCNQ salts are N-n-propylquinoline TCNQ salt, N-isopropylquinoline TCNQ salt, N-n-hexylquinoline TCNQ salt, N-ethylisoquinoline TCNQ salt, N-n-propylisoquinoline TCNQ salt, N-isopropylisoquinoline TCNQ salt, N-n-butylisoquinoline TCNQ salt, etc.

Illustrating this invention more in detail taking as the examples N-n-propylquinolinium+ (TCNQ−) (TCNQ) (hereinafter referred to as "P−1 salt"), N-isopropylquinolinium+ (TCNQ−) (TCNQ) (hereinafter referred to as "P−2 salt"), N-n-propylisoquinolinium+ (TCNQ−) (TCNQ) (hereinafter referred to as "P−3 salt") and N-isopropylisoquinolinium + (TCNQ−) (TCNQ) (hereinafter referred to as "P−4 salt"), their melting points are between about 210° and 235° C.: i.e. P−1 salt, 225°-235° C.; P−2 salt, 225°-235° C.; P−3 salt, 210°-220° C.; P−4 salt, 225°-235° C. They can be prepared, for instance, by reacting the corresponding quinolinium or isoquinolinium iodide with TCNQ in an appropriate molar ratio (e.g. 3:4) in an appropriate solvent (e.g. acetonitrile), followed by purification. With variation of the solvent used in the reaction or the purification, the molar ratio of the quinolinium or isoquinolinium portion and the TCNQ portion may be somewhat changed. For instance, when the solvent for the purification in the above process is acetonitrile, there is usually obtained the TCNQ salt in the complex salt form wherein m is 1. When the solvent is methanol, the obtained TCNQ salt is the complex salt wherein m is less than 1. The molar ratio of the quinolinium or isoquinolinium portion and the TCNQ portion may be also varied, for instance, by incorporating TCNQ in the TCNQ salt in a liquid state and allowing the resultant uniform mixture to cool for solidification. For instance, the solidified product obtained by incorporation of TCNQ into the TCNQ salt in the complex form wherein m is 1 in an amount of 5% by weight to the TCNQ salt shows the increase of the electroconductivity to a certain extent (e.g. 20%). However, the incorporation of TCNQ in a large amount such as 20% by weight or more will rather decrease the electroconductivity. In general, the TCNQ salts thus produced are formed in powedery needles or rods. When they are heated to melt and kept in a melt state for a long period of time, their sudden decomposition takes place to afford electrically insulating products. The times after completion of the liquefaction and before formation of the insulating products are as follows:

| TCNQ salt | (seconds) Temperature | |
|---|---|---|
| | 290° C. | 260° C. |
| P-1 | 26 | 80 |
| P-2 | 3 | 10 |
| P-3 | 30 | 120 |
| P-4 | 30 | 125 |

Note:
Heating was carried out by charging the crystalline powder of the TCNQ salt in a case made of aluminum and contacting the case onto a metal plate maintained at the designed temperature.

Therefore, it is necessary that the TCNQ salt in a liquid state is allowed to cool for solidification prior to its decomposition, whereby a solid electrolyte having a high electroconductivity is obtained. In case of P−1 salt and P−2 salt, for instance, they may be heated to a temperature above their melting points but below about 300° C. and, within about 1 minute (preferably within about 20 seconds) after completion of the liquefaction, started to cool at room temperature. In case of P−3 salt and P−4 salt, they may be heated to a temperature above their melting points but below about 320° C. and, within about 4 minutes (preferably within about 1 minute) after completion of the liquefaction, started to cool at room temperature. As the results of solidification, there are obtainable solid electrolytes having an electroconductivity of 20-30 Ωcm (25° C.). When the cooling was carried out within several seconds after completion of the liquefaction, the resulting solidified product showed the following electroconductivity (at 25° C.): P−1 salt, 23 Ωcm; P−2 salt, 35 Ωcm; P−3 salt, 36 Ωcm; P−4 salt, 31 Ωcm.

The solid electrolyte formed by this invention is not the collective product of fine crystals as obtained in the procedure (1) or (2) but in a polycrystalline block state. Further, it retains an excellent repairability for the anodized surface of a film forming metal.

According to this invention, the TCNQ salt itself in a liquid state is applied onto a film forming metal. Thus, different from the procedure (1), the attachment of the TCNQ salt onto a film forming metal to make a layer of the TCNQ salt having a sufficient thickness on the metal or impregnate the metal with a sufficient amount of the TCNQ salt can be accomplished by a single operation. The attachment is satisfactory irrespective of the metal being foil-like or porous. Thus, the procedure of the invention is quite suitable for mass-production of solid electrolytes without any deterioration of the TCNQ salt as seen on drying in the procedure (1) or (2). Since the attaching power of the solid electrolyte onto the metal is sufficiently great, the use of any binding resin is not needed, and any depression of the electroconductivity due to the binding resin can be avoided.

Practical and presently preferred embodiments of the invention are illustratively shown in the following Examples.

EXAMPLE 1

N-n-Propylisoquinolinium+ (TCNQ−) (TCNQ) (i.e. P−3 salt) was prepared by reacting N-n-propylisoquinolinium iodide with TCNQ in a molar ratio of 3:4 in acetonitrile. Separately, a sintered product of powdery alumina was subjected to anodic oxidation to make a porous capacitor element having an anodized surface.

The above prepared P−3 salt in powder crystals was charged in an aluminum made vessel, if necessary, under pressure, and the vessel was heated to liquefy the P−3 salt. Into the P−3 salt in a liquid state kept at a temperature of 250° to 260° C., the capacitor element pre-heated to a temperature of 250° to 260° C. was immersed, and immediately thereafter, the vessel was allowed to cool to room temperature, whereby the P−3 salt impregnated in the micropores of the capacitor element was solidified to give a solid electrolyte. The time required for the operation from the liquefaction of the P−3 salt to the start of the cooling was about 5 seconds, and the time required for the depression of the temperature from the start of the cooling to a temperature below the melting point was several seconds such as 4 seconds.

The vessel was eliminated from the capacitor element impregnated with the solid electrolyte. Onto the surface of the capacitor element, a graphite layer and a silver painting composition layer were formed in order by a conventional procedure. The resulting capacitor element was accommodated in an aluminum case together with a negative electrode lead wire and fixed therein by the use of a solder and an epoxy resin to give a solid electrolyte capacitor as shown in FIG. 1 of the accompanying drawing. In this drawing showing a section view of the capacitor, (1) is the capacitor element immersed with the solid electrolyte, (2) is the graphite layer, (3) is the silver paint coating composition layer, (4) is the positive lead wire, (4') is the negative lead wire, (5) is the aluminum case, (6) is the solder and (7) is the epoxy resin.

When the capacitor element used in the above Example is compared to the one giving a conventional capacitor having a capacity of 1 $\mu$F with manganese dioxide as the solid electorlyte, the resultant capacitor shows a capacity of about 1 $\mu$F. This means that the solid electrolyte in this Example has an impregnation rate of nearly 100% when that of manganese dioxide is considered as 100%.

The temperature characteristics and high temperature load characteristics of the capacitor obtained in the above Example are respectively shown in Tables 1 and 2 wherein C is the capacity ($\mu$F), $\Delta$C is the capacity variation rate (%), tan $\delta$ is the loss (%) and LC/30" is the leakage current ($\mu$A) 30 seconds after impressed with a rated voltage. In Tables 1 and 2, there are also shown the characteristics of the capacitor obtained in the same manner as above but using N-n-propylquinolinium+ (TCNQ−) (TCNQ) (i.e. P−1 salt) instead of P−3 salt.

TABLE 1

| Solid electrolyte | Temperature characteristics | | | | | | | |
|---|---|---|---|---|---|---|---|---|
| | −40° C. | | −25° C. | | +20° C. | | +85° C. | |
| | Capacity | | | | | | | |
| | $\Delta$C | tan $\delta$ | $\Delta$C | tan $\delta$ | C | tan $\delta$ | $\Delta$C | tan $\delta$ |
| P-3 salt | −5.0 | 2.4 | −4.2 | 2.2 | 1074 | 2.6 | +13.7 | 4.0 |
| P-1 salt | −5.3 | 1.6 | −4.5 | 1.5 | 793 | 2.8 | +5.7 | 6.2 |

TABLE 2

| Solid electrolyte | High temperature load characteristics (impressed with a standardized voltage of 10 V) | | | | | |
|---|---|---|---|---|---|---|
| | Time | | | | | |
| | Initial | | | After 1000 hrs at 85° C. | | |
| | Item | | | | | |
| | C | tan $\delta$ | LC/30" | C | tan $\delta$ | LC/30" |
| P-3 salt | 1074 | 2.6 | 0.02 | 1039 | 1.6 | 0.02 |
| P-1 salt | 793 | 2.8 | 0.02 | 740 | 2.0 | 0.02 |

In the above Example, there may be used a rolled element prepared by rolling up separating sheets wherein an etched aluminum foil as the negative electrode and a film formed aluminum foil as the positive electrode are sandwiched instead of the above used element of powder sintered type. Namely, the rolled element is impregnated with a TCNQ salt in a liquid state, followed by solidifying, and sealed with a resin. The resulting capacitor can afford similar temperature characteristics and high temperature load characteristics to those of the capacitor of powder sintered type. In this case, the cut portion of the film formed foil, the positive electrode lead wire, etc. are required to be previously subjected to film forming treatment. However, a vessel used as the bath for the TCNQ salt in a liquid state can be as such employed as th outer shell case, and a graphite layer and a silver paint coating composition layer can be omitted. The capacitor with the rolled element (equal to the one used in a conventional dry type electrolyte capacitor rated 50 V and 2.2 $\mu$F) showed the following characteristics: capacity=1.45 $\mu$F; tan $\delta$=1.8%; LC/30"=0.04 $\mu$A.

EXAMPLE 2

In the same manner as in Example 1 but using N-isoproylquinolinium+ (TCNQ−) (TCNQ) (i.e. P−2 salt) instead of P−3 salt, there was prepared a solid electrolyte capacitor. The capacity was 0.75 $\mu$F, and the impregnation rate was 75%. The high temperature load characteristics (impressed with a standardized voltage of 10 V at 85° C.) were as follows:

TABLE 3

| Initial value | | | Value after 500 hrs | | |
|---|---|---|---|---|---|
| Capacity | tan $\delta$ | Leakage current | Capacity | tan $\delta$ | Leakage current |
| 752 nF | 2.0% | 0.03 $\mu$A/10" | 740 nF | 2.8% | 0.02 $\mu$A/10" |

EXAMPLE 3

A capacitor element prepared by rolling up a separating sheet (Manila paper) with a film formed foil as the positive electrode and an etched aluminum foil was subjected to carbonization of the separating sheet at 240° C. for 4 hours. The resultant capacitor element was immersed in an aluminum case charged with a TCNQ salt as liquefied by heating on a metal plate of 290° C. and cooled with water rapidly for solidification. After sealing with a resin and aging, the obtained capacitor was subjected to testing for temperature characteristics and life characteristics, from which the results are shown respectively in Tables 4 and 5, wherein Cap and tan $\delta$ represent respectively the capacity and the loss at 120 Hz, ESR represents an equivalent series resistance of 100 kHz, $\Delta$Cap represents the capacity variation to Cap at +25° C. and LC is the value after 15" from impressing with 25 V.

TABLE 4

| | Temperature characteristics | | | | | | | | | |
|---|---|---|---|---|---|---|---|---|---|---|
| | Temperature | | | | | | | | | |
| | +85° C. | | | +25° C. | | | | −40° C. | | |
| | Characteristics | | | | | | | | | |
| TCNQ salt | $\Delta$Cap (%) | tan $\delta$ (%) | ESR (m$\Omega$) | Cap ($\mu$F) | tan $\delta$ (%) | LC ($\mu$A) | ESR (m$\Omega$) | $\Delta$Cap (%) | tan $\delta$ (%) | ESR (m$\Omega$) |
| P-1 salt | +15.4 | 5.4 | 610 | 2.31 | 1.8 | 0.11 | 690 | −4.1 | 1.8 | 1140 |
| P-3 salt | +6.2 | 3.2 | 320 | 2.65 | 1.8 | 0.10 | 460 | −5.1 | 2.4 | 1310 |
| N—n-butyl isoquino- | +9.4 | 3.2 | 99 | 2.69 | 0.95 | 0.08 | 103 | −3.4 | 0.83 | 132 |

TABLE 4-continued

| TCNQ salt | Temperature characteristics | | | | | | | | | |
|---|---|---|---|---|---|---|---|---|---|---|
| | +85° C. | | | +25° C. | | | | −40° C. | | |
| | ΔCap (%) | tan δ (%) | ESR (mΩ) | Cap (µF) | tan δ (%) | LC (µA) | ESR (mΩ) | ΔCap (%) | tan δ (%) | ESR (mΩ) |
| linium+ (TCNQ−) (TCNQ) | | | | | | | | | | |

TABLE 5

| TCNQ salt | Life characteristics (25 V impressed) | | | | | | | |
|---|---|---|---|---|---|---|---|---|
| | Initial | | | | After 500 hours at 95° C. | | | |
| | Cap (µF) | tan δ (%) | LC (µA) | ESR (mΩ) | Cap (µF) | tan δ (%) | LC (µA) | ESR (mΩ) |
| P-1 salt | 2.31 | 1.8 | 0.11 | 690 | 2.19 | 2.1 | 0.07 | 690 |
| P-3 salt | 2.65 | 1.8 | 0.10 | 460 | 2.50 | 1.9 | 0.07 | 470 |
| N—n-butyl isoquinolinium+ (TCNQ−) (TCNQ) | 2.69 | 0.95 | 0.08 | 103 | 2.50 | 1.1 | 0.05 | 115 |

As understood from the above, the present invention can achieve the attachment of a solid electrolyte onto a film forming metal by a simple operation without deterioration of the solid electrolyte and provide a capacitor having a large capacity and excellent temperature characteristics.

What is claimed is:

1. In a solid electrolyte capacitor with a solid electrolyte, the improvement wherein the solid electrolyte is obtained by solidifying a liquid 7,7,8,8-tetracyanoquinodimethane salt by cooling, said salt being so stable in the liquid state as not substantially decomposing for a period of time sufficient to allow contact with and attachment to an oxide-film forming metal.

2. The capacitor according to claim 1, wherein the 7,7,8,8-tetracyanoquinodimethane salt is retained in the liquid state at a temperature not higher than 320° C. for a period of not more than about 4 minutes after completion of the liquification.

3. The capacitor according to claim 2, wherein the 7,7,8,8-tetracyanoquinodimethane salt is retained in the liquid state at a temperature not higher than 300° C. for a period of not more than about 1 minute after completion of the liquification.

4. The capacitor according to claim 1 wherein the 7,7,8,8-tetracyanoquinodimethane salt is a salt with an N-substituted quinoline or isoquinoline wherein the substituent at the N-position is a hydrocarbon group.

5. The capacitor according to claim 4, wherein the substituent at the N-position is a $C_2$-$C_{18}$ alkyl group.

6. The capacitor according to claim 1, wherein the 7,7,8,8-tetracyanoquinodimethane salt is the N-n-propylquinolinium salt.

7. The capacitor according to claim 1, wherein the 7,7,8,8-tetracyanoquinodimethane salt is the N-isopropylquinolinium salt.

8. The capacitor according to claim 1, wherein the 7,7,8,8-tetracyanoquinodimethane salt is the N-n-hexylquinolinium salt.

9. The capacitor according to claim 1, wherein the 7,7,8,8-tetracyanoquinodimethane salt is the N-ethylisoquinolinium salt.

10. The capacitor according to claim 1, wherein the 7,7,8,8-tetracyanoquinodimethane salt is the N-n-propylisoquinolinium salt.

11. The capacitor according to claim 1, wherein the 7,7,8,8-tetracyanoquinodimethane salt is the N-isopropylisoquinolinium salt.

12. The capacitor according to claim 1, wherein the 7,7,8,8-tetracyanoquinodimethane salt is the N-n-butylisoquinolinium salt.

13. In a solid electrolyte capacitor comprising a positive film-forming metal having an anodized surface, a solid electrolyte and a negative collector, the improvement wherein the solid electrolyte is a complex salt of 7,7,8,8-tetracyanoquinodimethane and an $N(C_2$-$C_{18})$ alkyl isoquinoline, said solid electrolyte being formed by solidifying said complex salt from the liquid state.

14. The capacitor according to claim 13, wherein the molar proportion between the 7,7,8,8-tetracyanoquinodimethane and the $N$-$(C_2$-$C_{18})$alkyl-isoquinoline is about 1:1.

15. In a method for forming a solid electrolyte capacitor, the improvement wherein the solid electrolyte is obtained by solidifying a 7,7,8,8-tetracyanoquinodimethane salt from the liquid state by cooling, said salt being so stable in the liquid state as not substantially decomposing for a period of time sufficient to allow contact with and attachment to an oxide film-forming metal.

16. The process according to claim 15, wherein the salt is maintained in the liquid state for a period of not more than 4 minutes, at a temperature not higher than 320° C.

17. The process according to claim 16, wherein the salt is maintained in the liquid state for a period not more than about 1 minute, at a temperature not higher than about 300° C.

18. The process according to claim 15, wherein the 7,7,8,8-tetracyanoquinodimethane salt is a salt with a quinoline or isoquinoline which is substituted at the N-position with a hydrocarbon group.

19. The process according to claim 18, wherein the substituent at the N-position is a $C_2$-$C_{18}$ alkyl group.

20. The process according to claim 19, wherein the 7,7,8,8-tetracyanoquinodimethane salt is selected from the group consisting of the N-n-propylquinolinium, N-isopropylquinolinium, N-n-hexylquinolinium, N-ethylisoquinolinium, N-n-propylisoquinolinium, N-isopropylisoquinolinium and N-n-butylisoquinolinium salts.

21. The process according to claim 19, wherein said salt is a complex salt of 7,7,8,8-tetracyanoquinodimethane and an $N(C_2-C_{18})$alkyl isoquinoline.

22. The process according to claim 21, wherein the molar proportion between the 7,7,8,8-tetracyanoquinodimethane and the $N(C_2-C_{18})$ alkylisoquinolinium is about 2:1.

23. A process for forming a solid electrolyte suitable for use in a solid electrolyte capacitor, comprising solidifying a 7,7,8,8-tetracyanoquinodimethane salt from the liquid state by cooling, said salt being so stable in the liquid state as not substantially decomposing for a period of time sufficient to allow contact with and attachment to an oxide film-forming metal.

* * * * *